Patented May 7, 1946

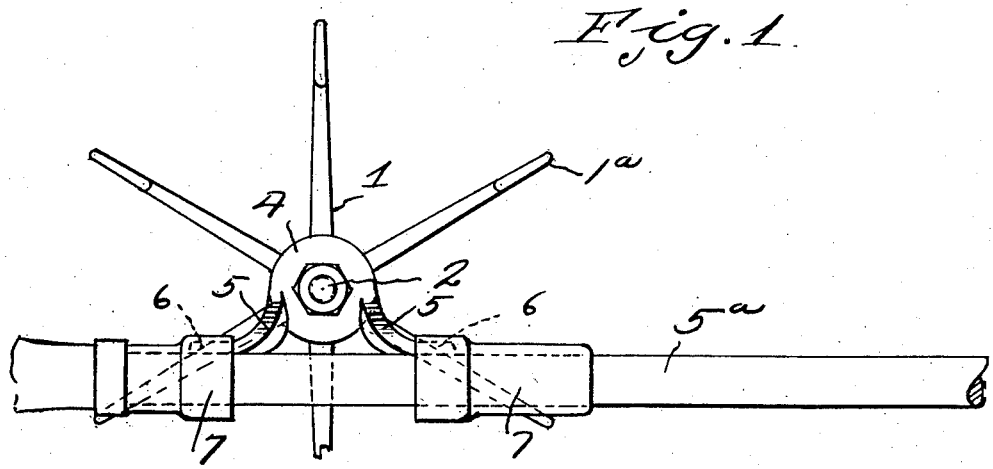
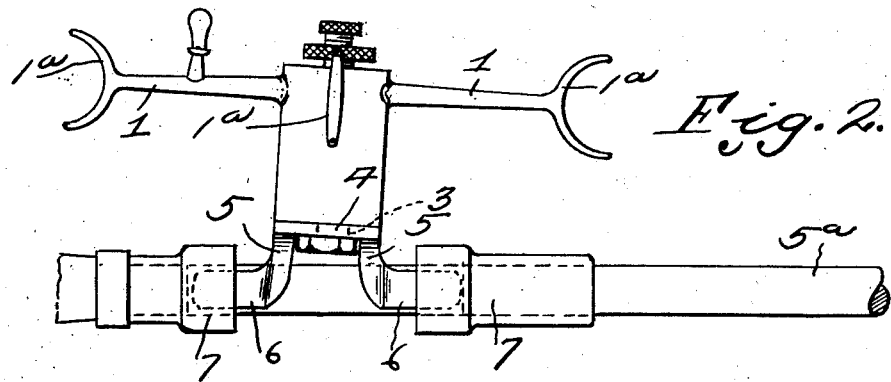
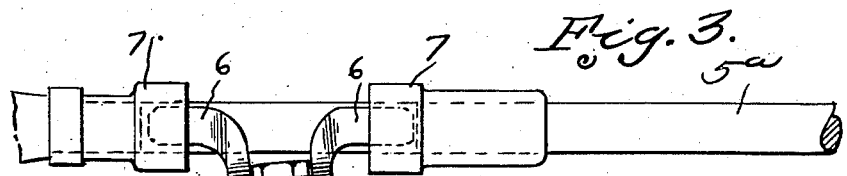
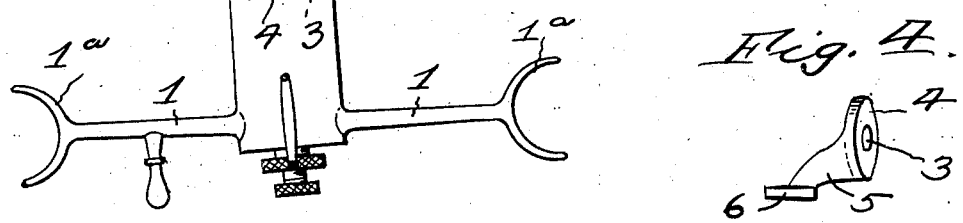

2,400,007

UNITED STATES PATENT OFFICE 2,400,007

REEL MOUNT

Henry A. Kiest, deceaced, late of Knox, Ind., by Pearl F. Kiest, executrix, Knox, Ind., assignor to Pearl F. Kiest Application October 9, 1944, Serial No. 557,897

2 Claims. (Cl. 43—22)

The invention relates to reel mounts, and has for its object to provide a reel mount particularly adapted for use in connection with the reel shown in the patent issued to Henry A. Kiest, Number 1,385,457, issued July 26, 1921.

A further object is to provide a reel mount bracket having a right or left hand off-set plate, adapted to be attached to a bolt of the reel on the axis of the reel, and spaced legs for reception in the reel mount on the rod, differently shaped so that the reel supporting plate will be at an acute angle to the axis of the rod, thereby alining the reel arms with the guide eye of the rod so that the fishing line will readily reel on the arms.

A further object is to make the brackets right and left hand so the reel can be supported on either side of the rod in its acute angular position to the rod thereby providing means for accommodating the reel and mount for use by right or left handed persons.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of a conventional form of rod and reel seat, showing the improved bracket applied thereto.

Figure 2 is a top plan view of the reel and rod, showing the reel supported on the left hand side of the rod.

Figure 3 is a view similar to Figure 2 showing the reel supported on the right hand side of the rod.

Figure 4 is an end view of the supporting bracket.

Referring to the drawing, the numeral 1 designates a reel of the type shown in the patent above identified.

The reel is provided with a threaded member 2, which threaded member extends through an aperture 3 in the bracket plate 4. Referring to Figure 1, it will be noted that the axis of the reel is above the axis of the fishing rod 5ª. The plate 4 is provided with downwardly and inwardly extending legs 5, which legs terminate in seat engaging arms 6, received in the ferrules 7 of the seat in the usual manner. It will be noted that the legs 5 are of different length, consequently the plate 4 and the reel are at an acute angle to the rod 5ª, therefore it will be seen that the reel arms 1ª can be alined with the line guide eye on the rod so that, as the reel is rotated, the line will be guided onto the reel arms.

Referring to Figure 4, it will be seen that the brackets can be made right and left handed for use by right and left handed persons, however some right handed fishermen desire the reel on the left hand side of the rod. It is the purpose, in vending, to supply, along with the reel, right and left handed brackets to adapt the device to the desires of various fishermen.

From the above it will be seen that a supporting bracket is provided for reels, which is simple in construction, and one which may be easily and quickly placed in the reel seat of the rod, and the reel will be properly inclined in relation to the axis of the rod so that the line will reel thereon.

The invention having been set forth what is claimed as new and useful is:

1. The combination with a reel disposed with its axis above a fishing pole and transversely of the axis of the pole, and a rod seat on the pole and below said reel axis and spaced from the inner end of the reel, of a supporting bracket for said reel, said bracket comprising a plate to which the inner end of the reel is attached, said plate being inclined whereby the axis of the reel is at an acute angle to the axis of the seat, supporting legs carried by said plate, said supporting legs inclining downwardly towards the seat and terminating in oppositely extending arms engaging the seat and means for attaching said arms to the seat.

2. A device as set forth in claim 1 wherein the downwardly and inwardly extending leg at the forward side of the plate is shorter than the other leg so that the axis of the reel is at an acute angle to the axis of the seat.

PEARL F. KIEST,
Executrix of the Estate of Henry A. Kiest, Deceased.